United States Patent [19]
Rees

[11] Patent Number: 5,746,409
[45] Date of Patent: May 5, 1998

[54] REINFORCED SEAT TRACK

[75] Inventor: Richard W.A. Rees, Greenville, Mich.

[73] Assignee: Excellence Manufacturing, Inc., Grand Rapids, Mich.

[21] Appl. No.: 684,567

[22] Filed: Jul. 19, 1996

[51] Int. Cl.[6] .................................................. F16M 13/00
[52] U.S. Cl. ........................... 248/422; 248/429; 296/65.1
[58] Field of Search .................................. 248/429, 430, 248/424, 419, 422; 296/65.1

[56] References Cited

U.S. PATENT DOCUMENTS

| | | | |
|---|---|---|---|
| 4,533,107 | 8/1985 | Okazaki et al. | 248/430 |
| 4,821,991 | 4/1989 | Aihara et al. | 248/430 |
| 4,828,214 | 5/1989 | Kanai et al. | 248/430 |
| 5,275,457 | 1/1994 | Satoh et al. | 248/422 X |
| 5,447,352 | 9/1995 | Ito et al. | 248/424 X |

FOREIGN PATENT DOCUMENTS

| | | | |
|---|---|---|---|
| 126228 | 7/1983 | Japan | 248/429 |
| 6-107051 | 4/1994 | Japan | 248/429 |

*Primary Examiner*—Ramon O. Ramirez
*Attorney, Agent, or Firm*—Warner Norcross & Judd

[57] ABSTRACT

An adjustable, automotive vehicle seat track having slidably interfit upper and lower tracks. The upper track is generally cross-shaped and includes a vertical web and a horizontal web. Opposite longitudinal edges of the horizontal web define a pair of inwardly opening, longitudinal channels. A pair of opposed, longitudinal flanges extend outwardly from the bottom edge of the vertical web. The lower track is generally U-shaped in cross section and includes a pair of longitudinal flanges slidably interfitted with the horizontal web channels and a longitudinal channel slidably interfitted with the vertical web flanges. The lower track channel is partially closed around the vertical web flanges to resist separation of the upper track from the lower track.

22 Claims, 7 Drawing Sheets

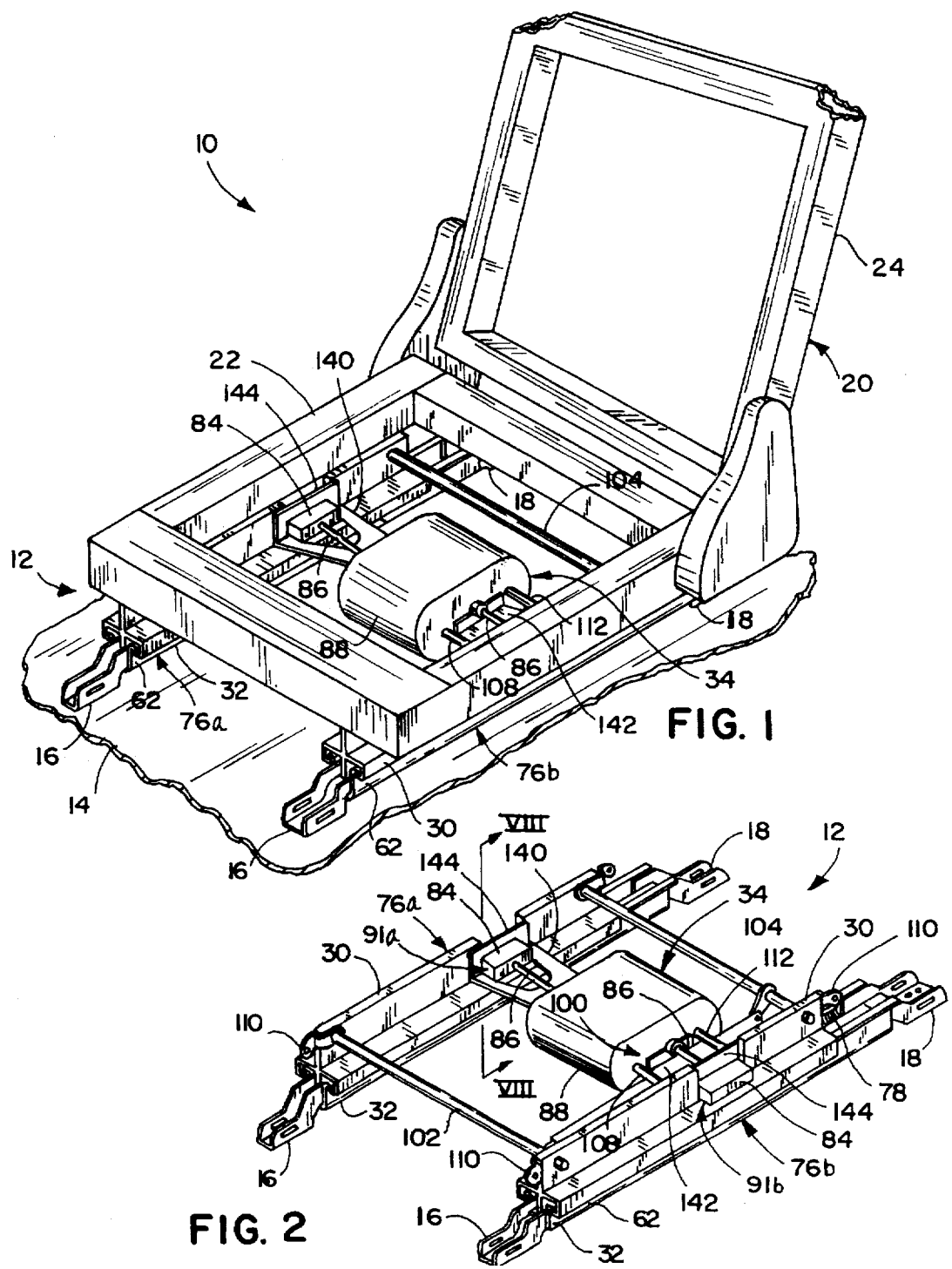

REINFORCED SEAT TRACK

BACKGROUND OF THE INVENTION

The present invention relates to automotive vehicle seating, and more particularly to an adjustable track assembly for an automotive vehicle seat.

Automotive vehicle seating is typically provided with an adjustable track assembly which allows the seat to slide forward or rearward with relation to the floor pan. As shown in FIG. 13, a conventional track assembly 200 includes a lower track 202 secured to the floor 204 of the vehicle and an upper track 206 slidably interfitted with the lower track 202. The lower track 202 is typically secured to the floor by floor supports 208 that extend between the bottom of the track and the floor 204. The lower track 202 is generally U-shaped in cross section and includes a pair of longitudinal flanges 210 and 212 extending outwardly along the top of each side of the track. The upper track 206 is generally C-shaped and defines channels 218 slidably fitted over the flanges of the lower track. The seat (not shown) is mounted to the upper track 206 allowing it to move with respect to the lower track 202.

In order to make seating more comfortable and easier to install, manufacturers are increasingly producing seats in which one or more of the belt anchorages are attached directly to the seat rather than to the floor or other part of the structure of the vehicle. This type of design is often referred to as "belts-to-seat." The belts-to-seat design allows one or more of the seat belt anchorages to move with the seat when it is adjusted. Most often just the inboard buckle and strap are permitted to move. This design also eliminates the need for the seat belts to be separately installed within the vehicle. With this design, however, the track assembly 200 is required to withstand the inertial loads of the seat and occupant during a collision. These loads are transferred from the upper track 206 to the floor 204 of the vehicle by the flanges 210, 212 and vertical sidewalls 214, 216 of the lower track 202. The flanges and side walls of a conventional lower track may deform under these loads damaging the track assembly and possibly rendering it inoperative. If the loads are great enough the upper and lower tracks 202 and 206 may even separate from each other permitting the seat to break free from the vehicle increasing the chance of injury to the occupant.

In addition, many seats include power seat adjusters that move the upper track with respect to the lower track. The drive mechanism for power seat adjusters typically includes a rack and pinion arrangement. The rack is mounted to the lower track along the inside of one of the side walls. The pinion is meshed with the rack and is supported in a gear housing mounted to the top of the upper track. The pinion is driven by a worm gear that is also supported in the gear housing. All horizontal loads on the seat and track assembly are transmitted through the drive mechanism, and more particularly through the rack, pinion, worm gear, and gear housing. Due to the inertial load of the occupant, the loads placed on the drive mechanism during a collision are greater with a belts-to-seat design than with a standard design. A conventional drive mechanism may be incapable of withstanding these loads and may be damaged or destroyed. If the load is great enough, the gear housing may break free from the upper track permitting the upper track to slide freely within the lower track—increasing the chance of injury to the occupant.

SUMMARY OF THE INVENTION

The aforementioned problems are overcome by the present invention which provides a track assembly having an upper track with a vertical web that is slidably interlocked within the bottom wall of the lower track. In the disclosed embodiment, the vertical web has an inverted T-shaped cross section including an upright wall and a pair of opposed flanges. The upper track also includes a C-shaped horizontal web defining a pair of opposed, longitudinal, inwardly-opening channels. The lower track is generally U-shaped in cross section and includes a bottom wall and a pair of side walls. A pair of flanges extend outwardly from the top of each side wall and are slidably interfitted with the channels of the upper track. The bottom wall defines an interlocking channel that is slidably intermitted with the flanges of the upper track.

The upper track also defines a mount for seating the gearbox assembly of the drive mechanism. The mount is defined in both the vertical and horizontal webs. The mount is located so that the drive screw is approximately aligned with the centerline of the vertical web. Under horizontal loads, the drive screw may move axially within the mount until engaging the thick vertical and horizontal webs of the upper track. In this manner, horizontal loads placed on the drive screw are transferred directly to the upper track rather than through the gear housing. Furthermore, the C-shaped section of the horizontal web will resist any sideways "bursting" forces set up within the gearbox assembly because of accident loads.

The present invention further includes floor supports that mount to opposite ends of the lower track. The floor supports each include a pair of uprights fitted within the side walls of the lower track. The uprights are slotted to fit over the bottom wall of the lower track on opposite sides of the interlocking channel. These uprights may then be riveted to the lower track side walls. The rivets will be subjected to equal shear loading allowing the use of a smaller rivet than would be the case with conventional floor supports which are mounted with rivets displaced laterally along the lower surface as shown in FIG. 13.

The slots in the floor support uprights are made to be an interference fit with the lower channel, preferably by means of a saw tooth arrangement which adds to the stability of the system and may preclude the use of reinforcing rivets in some cases.

The present invention provides a simple, low-cost, lightweight track assembly that is reinforced to withstand increased inertial loads. The vertical rib improves the overall strength of the upper track and reduces the likelihood of it separating from the lower track during a collision. The mount opening reinforces the pinion against horizontal loads and allows the gear housing to be manufactured from a non-structural material such as unreinforced nylon. The use of nonstructural materials permits the housing to be interference fit to the longitudinal axis of the pinion thereby improving the stability of the drive mechanism. Additionally, the floor supports transfer the inertial loads from the area of the interlocking channel directly to the floor of the vehicle rather than through the side walls of the lower track. This reduces the likelihood of damage to the track assembly during a collision.

These and other objects, advantages, and features of the invention will be more readily understood and appreciated by reference to the detailed description of the preferred embodiment and the drawings.

BRIEF DESCRIPTION OF THE DRAWINGS

FIG. 1 is a perspective view of an automotive vehicle seat incorporating the present invention;

FIG. 2 is a perspective view of the track assembly;

DETAILED DESCRIPTION OF THE PREFERRED EMBODIMENT

Figure 3:
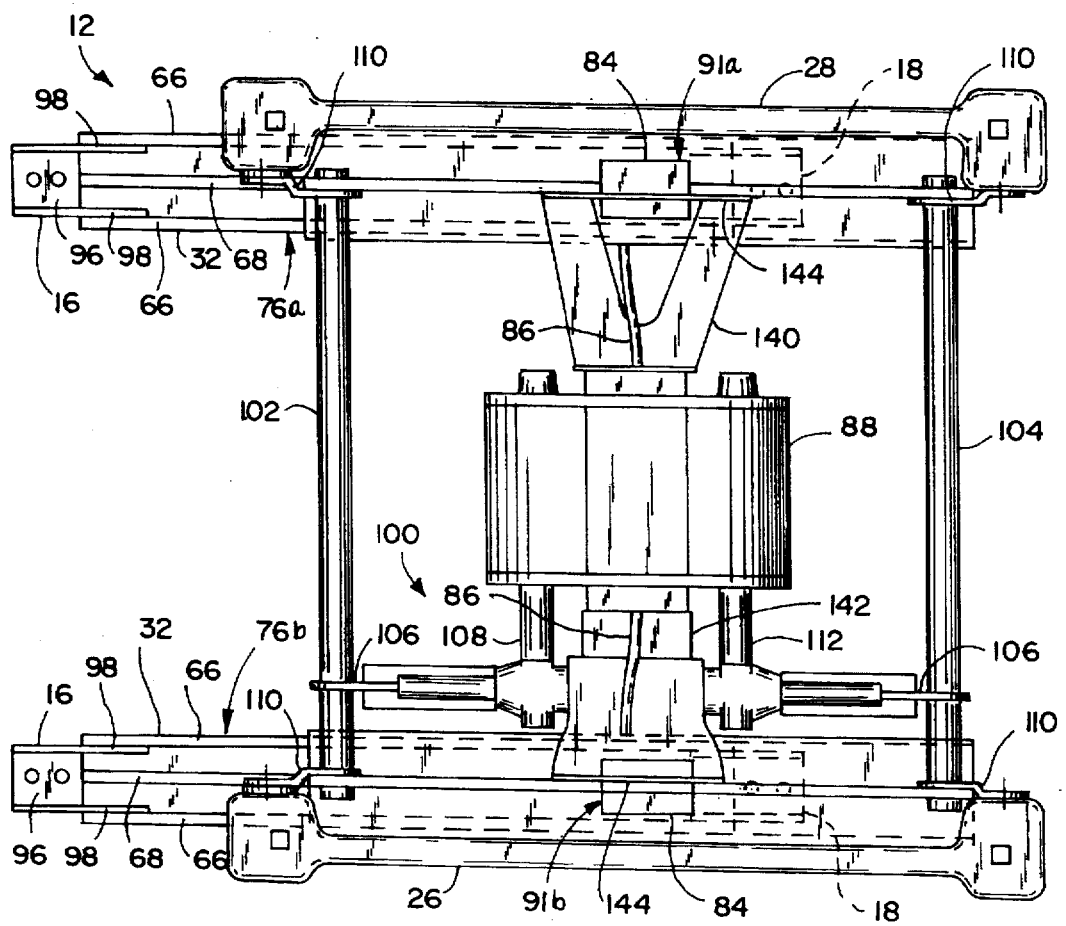
FIG. 3 is a top plan view of the track assembly.

An automotive vehicle seat incorporating a preferred embodiment of the present invention is illustrated in FIG. 1 and generally designated 10. For purposes of disclosure, the present invention will be described in connection with a power six-way seat adjuster. The present invention is also suited for use with other seat adjusters, both power and manual, such as two-, four-, and eight-way systems.

The seat 10 includes a track assembly 12, a seat frame 20 mounted atop the track assembly 12, and floor supports 16 and 18 for mounting the track assembly 12 to the floor 14 of the vehicle. The track assembly 12 allows the seat frame 20 to be moved forward or backward with respect to the floor 14. Referring also to FIGS. 2-5, the track assembly 12 includes right and left track pairs 76a–b. Each track pair 76a–b includes slidably interfitted upper and lower tracks 30 and 32, and is mounted to the floor 14 of the vehicle by floor supports 16 and 18. The floor supports 16 and 18 are attached to the floor 14 and to opposite ends of each lower track 32. The seat 10 includes a drive mechanism 34 to allow adjustment of the position of the upper tracks 30 with respect to the lower tracks 32, and consequently the position of the seat 10 with respect to the floor 14 of the vehicle.

The seat frame 20 is generally conventional and includes a cushion pan 22 and back frame 24. The seat frame 20 is mounted atop the track assembly 12 to both track pairs 76 by cushion pan brackets 26 and 28. The remaining elements (e.g. cushions, upholstery, and seat belts not shown) of the seat frame 20 are attached directly or indirectly to the cushion pan 22 or back frame 24 so that the entire seat moves in unison when the seat 10 is adjusted.

Figure 5:
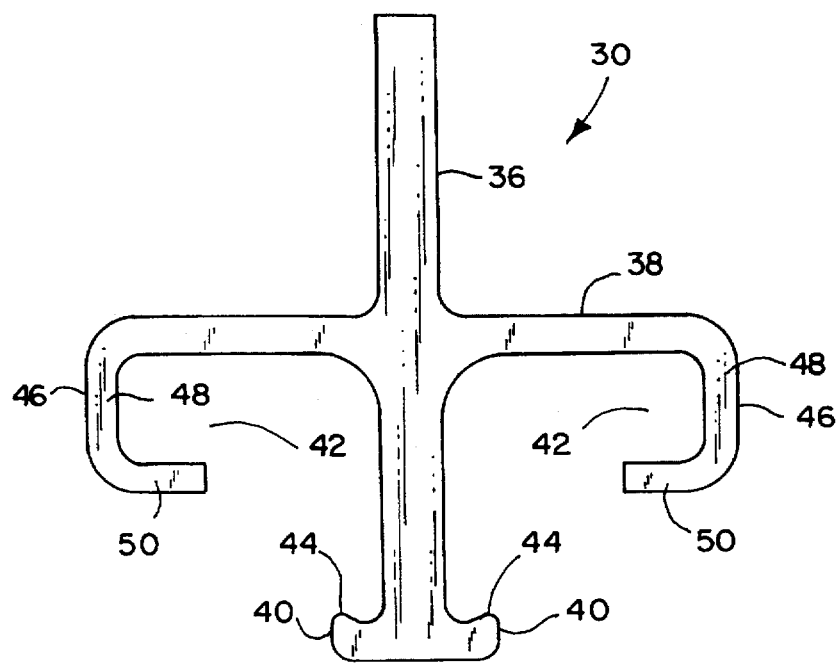
FIG. 5 is an end view of the upper track.
Figure 6:
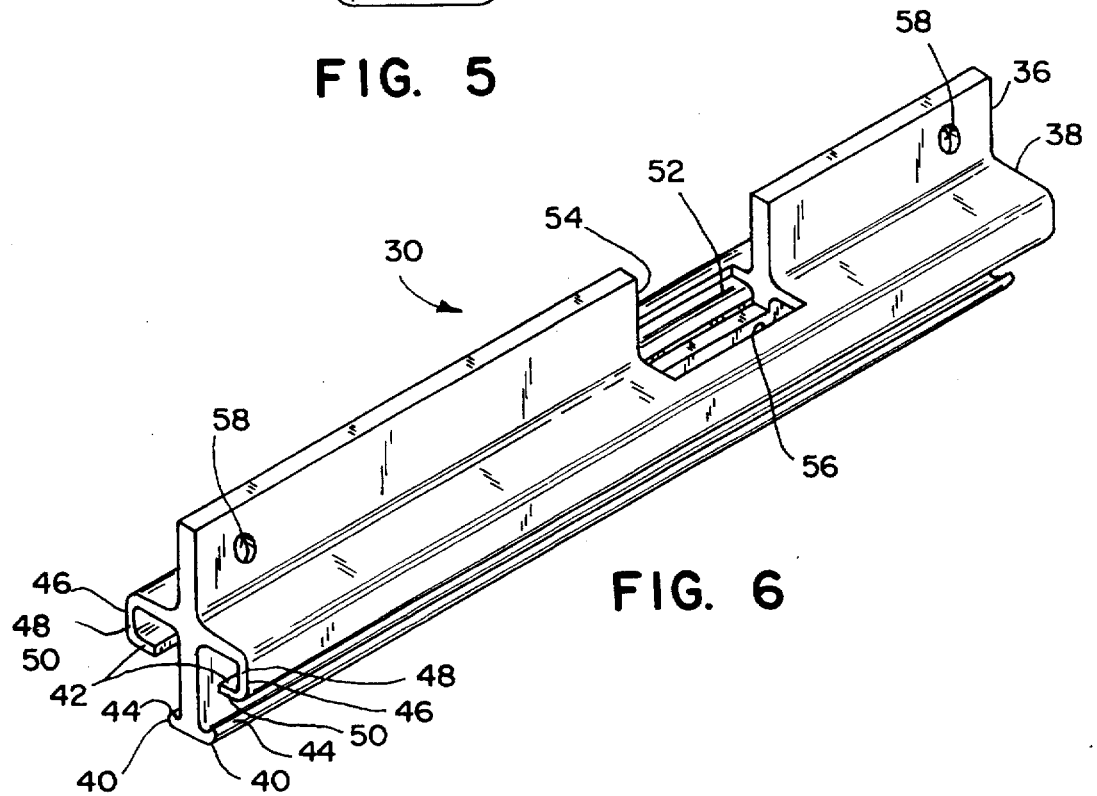
FIG. 6 is a perspective view of the upper track.

As perhaps best illustrated in FIGS. 5 and 6, the upper track 30 is generally +shaped in cross section and includes a vertical web 36 and a horizontal web 38. The vertical web 36 includes a pair of longitudinal flanges 40 extending outwardly in opposite directions along its bottom edge. A tapered, rounded protuberance 44 extends upwardly along the outer edge of each flange 40 to provide the flange 40 with a hook-like cross section. This cross section improves the interlock between the upper and lower tracks. A lip 46 extends downwardly along each of the longitudinal edges of the horizontal web 38. The lip 46 includes a first wall 48 extending down from the horizontal web 38 and a second wall 50 extending inwardly along the bottom of the first wall 48. Consequently, the horizontal web 38 defines a pair of opposed, inwardly opening channels 42 adapted to receive the lower track 32. The upper track 30 defines a central mount 52 for receiving the gearbox assembly 91 of the drive mechanism 34. The central mount 52 is defined by a rectangular slot 54 defined in the vertical web 36 and a rectangular opening 56 defined in the horizontal web 38. Also, the upper track 30 defines a torsion bar opening 58 at opposite longitudinal ends of the vertical web 36. These openings 58 are adapted to rotatably receive opposite ends of the height adjustment torsion bars 102 and 104. The upper track 30 is preferably extruded from aluminum or other strong, lightweight metal or metal matrix composites.

Figure 7:
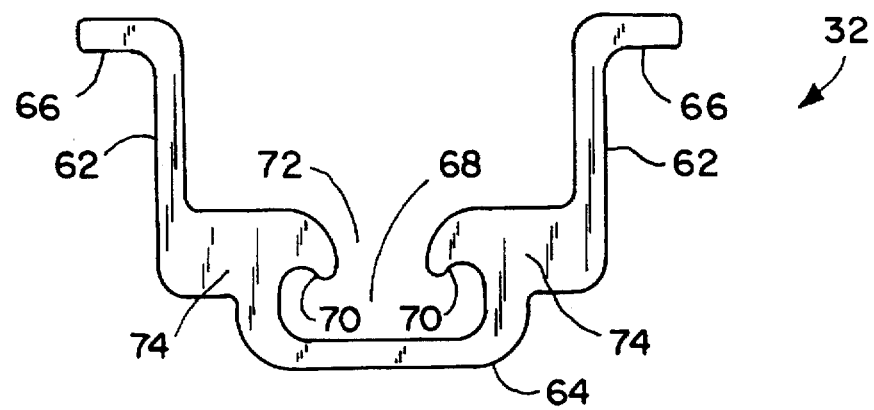
FIG. 7 is an end view of the lower track.

Referring now to FIG. 7, the lower track 32 is generally U-shaped in cross section and include a pair of side walls 62 extending upwardly from opposite longitudinal ends of a bottom wall 64. A longitudinal flanges 66 extends outwardly from the top edge of each side wall 62. The bottom wall 64 defines channel 68 adapted to slidably receive the flanges 40 of the upper track 30. The channel 68 is partially closed by a pair of opposed, longitudinal ears 70 extending partially into the mouth 72 of the channel 68. The ears 70 are angled slightly downward to wrap closely around the protuberances 44 of flanges 40. The bottom wall 64 includes reinforced portions 74 extending along each side of the channel 68. The reinforced portions 74 strengthen the lower track 32. The upper and lower tracks 30 and 32 are provided with enough clearance so that the channel 68 and flanges 40 do not contact each other during normal operation of the track assembly 12. Like the upper track 30, the lower track 32 is preferably extruded from aluminum or other strong, lightweight metal or metal matrix composites. A conventional bearing shoe 92 is fit over each lower track flange 66. The bearing shoes 92 are sandwiched between the lower track flanges 66 and the upper track channels 42 to provide smooth and easy movement of the tracks 30 and 32.

Figure 8:
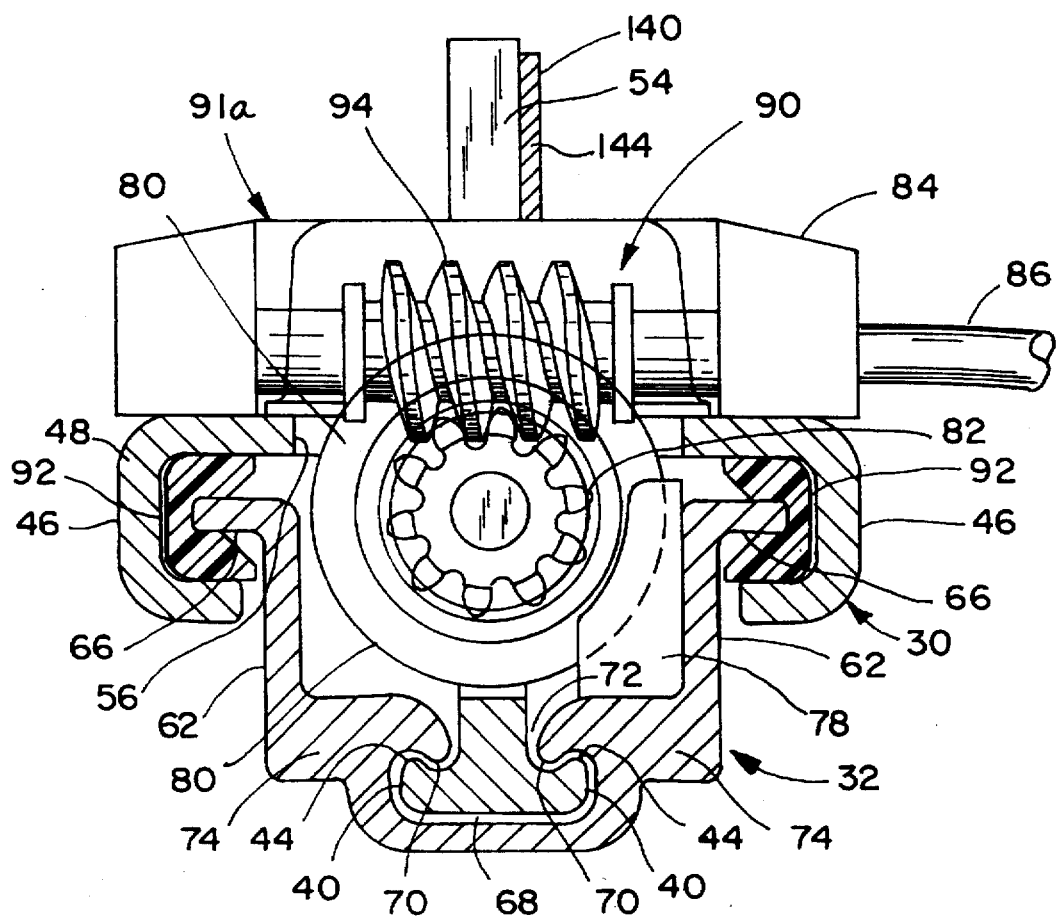
FIG. 8 is a sectional view of a portion of the track assembly taken along line VIII—VIII of FIG. 2.
Figure 9:
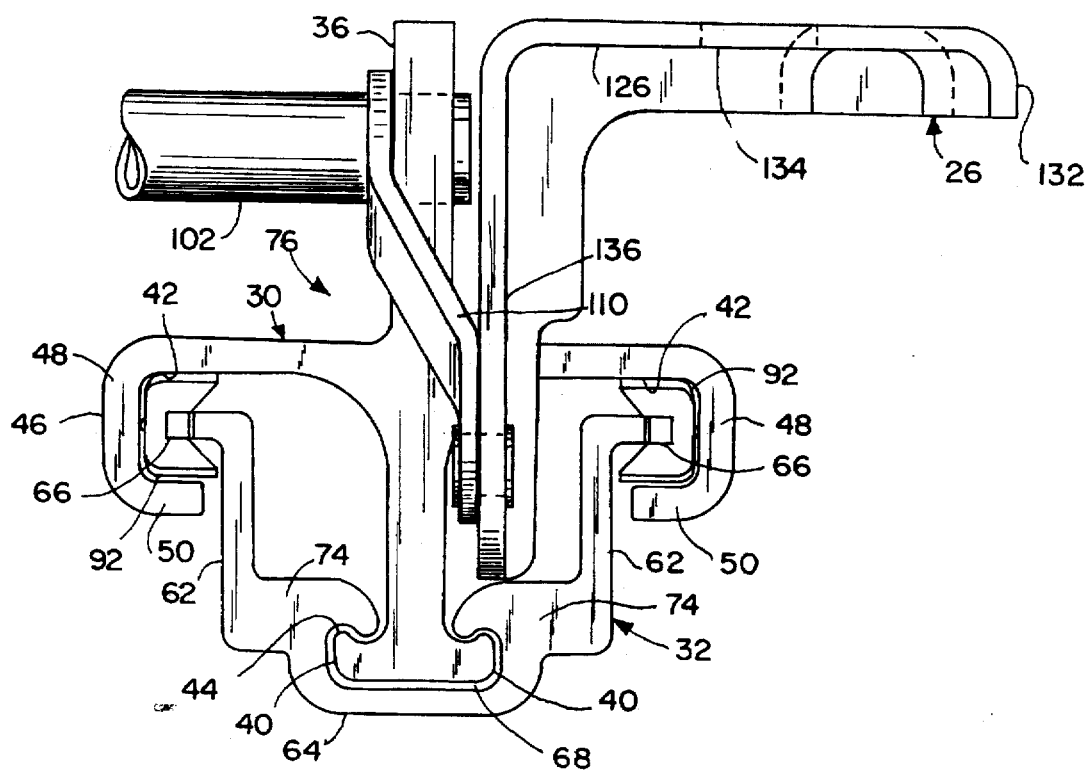
FIG. 9 is an end view of the left track pair with certain components removed for clarity.

The drive mechanism 34 includes a rack 78 mounted to each lower track 32, a gearbox assembly 91a–b mounted to each upper track 30, and a single motor 88 (one of three required for six-way power operation) to drive the gearbox assemblies 91a–b in unison providing simultaneous movement of the track pairs 76a–b. The racks 78 are mounted along the inner side wall 62 of each lower track 32 (See FIG. 8). Each gearbox assembly 91a–b includes a gear arrangement 90 contained within a gear housing 84. Each gear arrangement 90 includes a rack-engaging drive screw 80, a worm gear 82, and a worm 94 rotatably mounted within the gear housing 84. The drive gear 80 is threadedly meshed with the rack 78 so that rotation of the drive gear 80 causes longitudinally movement of the upper track 30 with respect to the lower track 32. The worm gear 82 is attached directly to the end of the drive screw 80 forming a single component. The drive gear 80 and worm gear 82 are mounted at a right angle to the worm 94, which is connected to the motor 88 by linkage 86. The worm gear 82 meshes with and is driven by the worm 94 so that operation of motor 88 rotates the drive screw 80. The gear housing 84 is secured to the upper track 30 in central mount 52 and is designed so that the axis of the drive screw 80 is aligned with the centerline of the thick vertical web 36. The motor 88 is mounted between the track pairs 76 by brackets 140 and 142. The brackets 140 and 142 are mounted to the upper track 30 and include a upright wall 144 that extends over the gear housing 84 capturing it within central mount 52.

Figure 4:
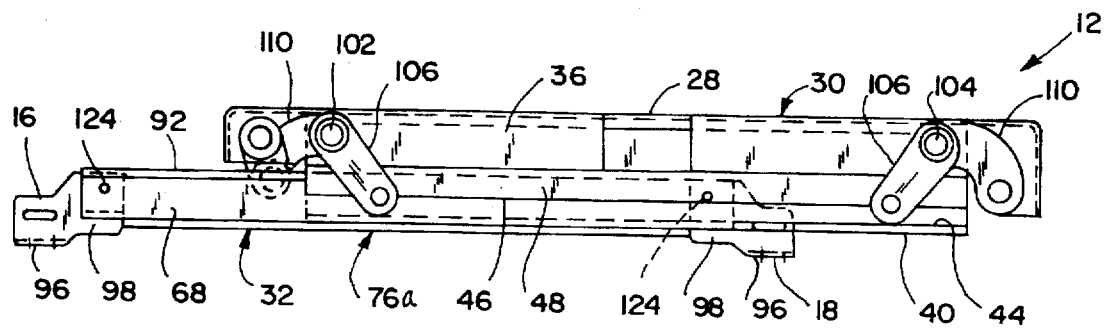
FIG. 4 is a side elevational view of the track assembly.
Figure 10:
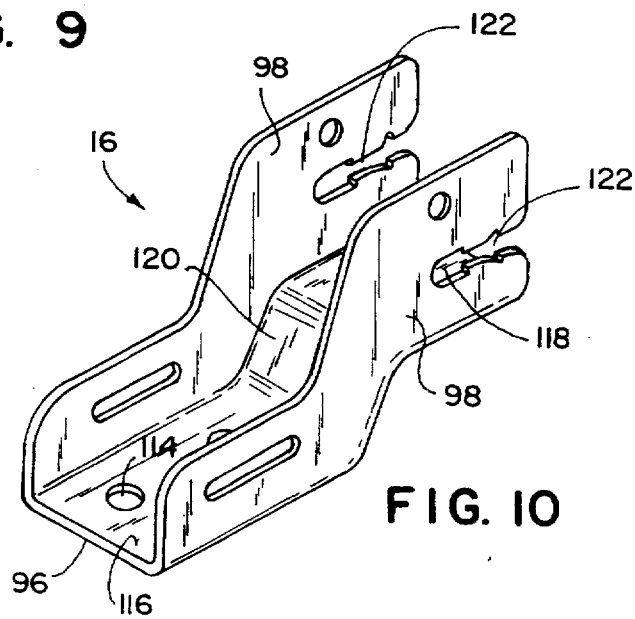
FIG. 10 is a perspective view of the front floor support.

The floor supports 16 and 18 interconnect the track assembly 12 and the floor 14, and are mounted to opposite longitudinal ends of each lower track 32 (See FIG. 4). The front floor support 16 is illustrated in FIG. 10 and includes a bottom wall 96 and a pair of opposed side walls 98 extending upwardly from opposite longitudinal edges of the bottom wall 96. The bottom wall 96 includes a floor engagement end 116, riser portion 120, and a track engagement end 118. The floor engagement end 116 is shaped to match the contour of the floor 14 and includes a mounting hole 114. The track engagement end 118 extends substantially horizontally. The side walls 98, at the track engagement end 118, define a pair of horizontal slots 122 adapted to fit over the reinforced portions 74 of the lower track bottom wall 64 on opposite sides of the lower track channel 68. The slots 122 have an interference fit with the reinforced portions 74 of the lower track 32 which may be of a saw tooth configuration. When installed, the slots 122 are fitted over the reinforced portions 74 so that the floor support side walls 98 extend inside the lower track 32 while the floor support bottom wall 96 extends outside the lower track 32. The slots 122 interlock the lower track bottom wall 64 and the floor support 16. Consequently, loads applied to the lower track bottom wall 64 are transferred directly to the floor 14 rather than through the lower track side walls 62. The floor support side walls 98 are secured to the lower track side walls 62 using conventional fasteners, such as self piercing rivets 124. The rear floor support 18 is similar to the front floor support 16. The primary difference between the front and rear floor supports 16 and 18 is the shape of the riser portion 120 and floor engagement end 116. These elements differ simply to match the contour of the floor 14. The floor supports 16 and 18 are preferably of a stamped steel construction, and will vary from application to application.

Figure 11:
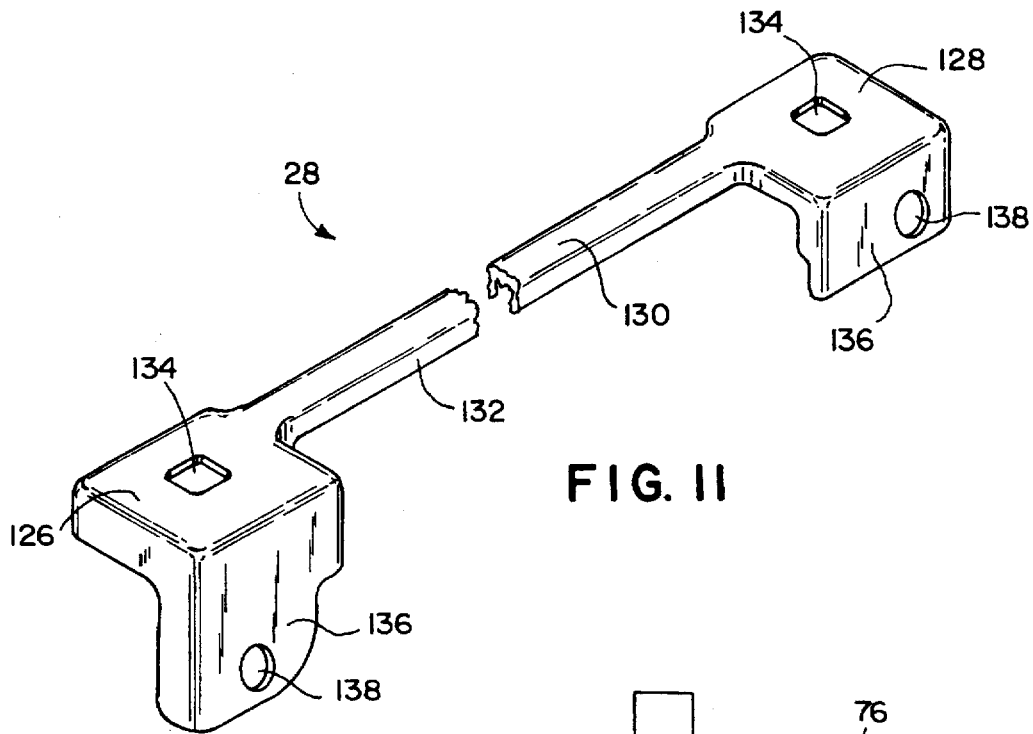
FIG. 11 is a perspective view of the cushion pan bracket.
Figure 12:
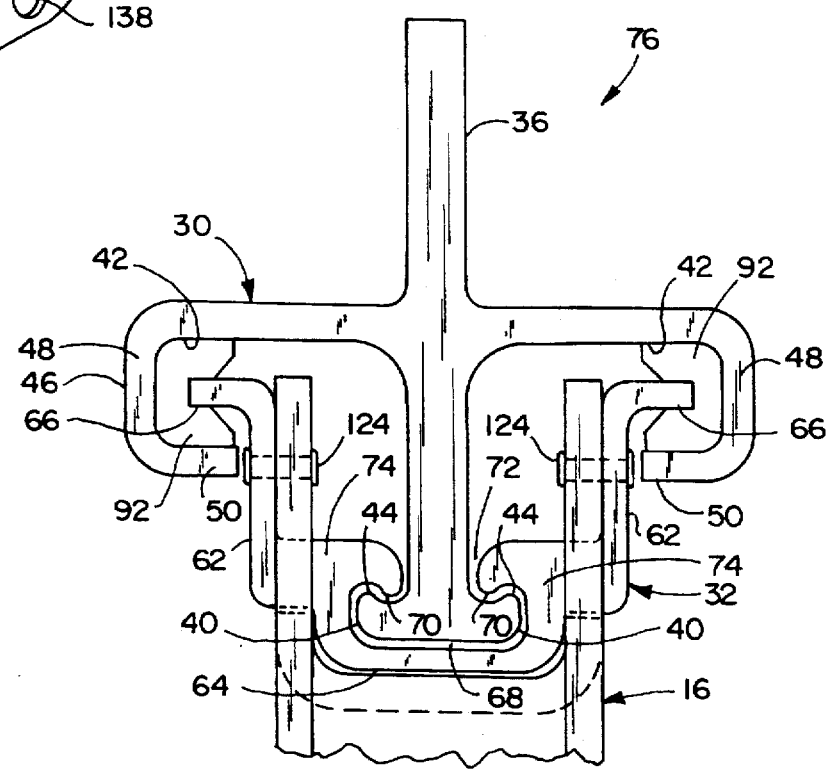
FIG. 12 is an end view of the left track pair with certain components removed for clarity.
Figure 13:
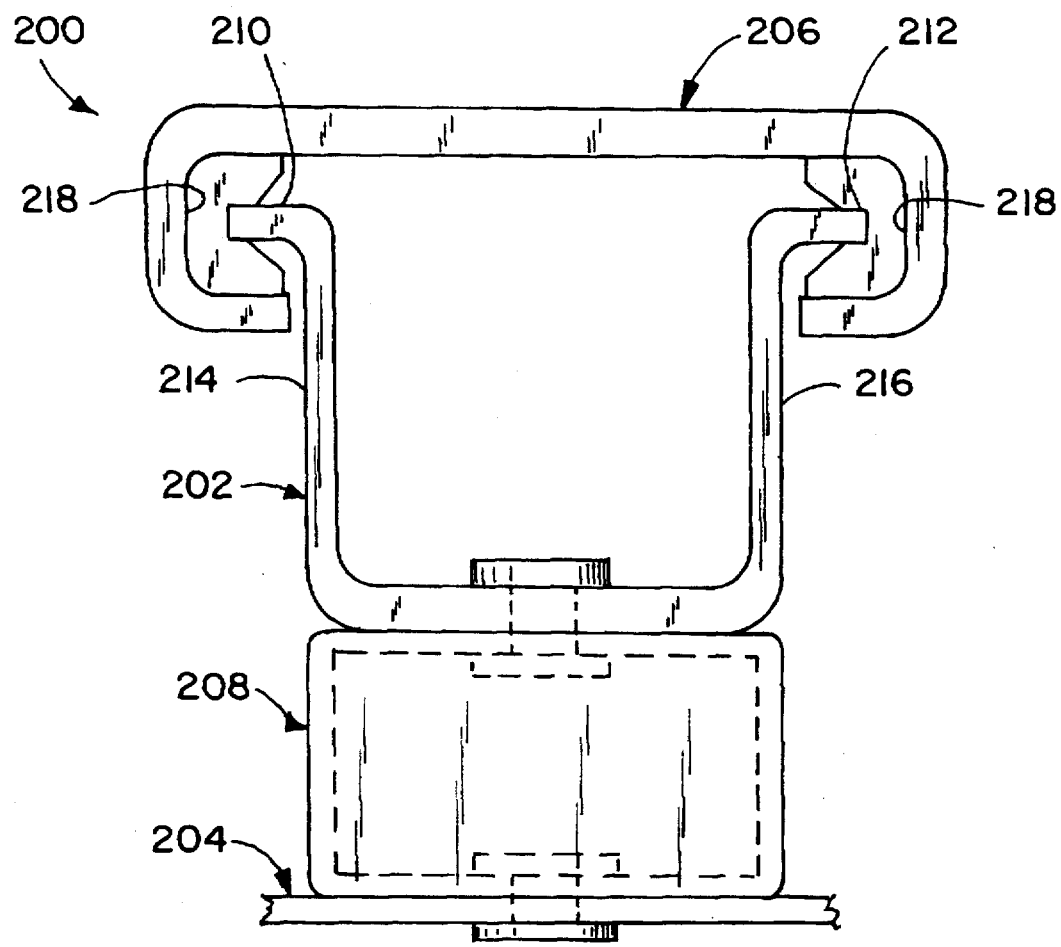
FIG. 13 is an end view of a track assembly according to the prior art.

The cushion pan brackets 26 and 28 interconnect the cushion pan 22 and the track assembly 12, and are preferably of a stamped steel construction. The right cushion pan bracket 28 is illustrated in FIG. 11. The left cushion pan bracket 26 is the mirror image of the right cushion pan bracket 28, and therefore will not be described in detail. The right cushion pan bracket 26 includes an elongated central web 130 and a support wall 132 extending downwardly around the periphery of the central web 130. Opposite ends 126 and 128 of the cushion pan bracket 28 are enlarged to support the bottom of the cushion pan 22, and each end 126 and 128 defines a mounting hole 134. An inside portion of the support wall 132 extends downwardly at ends 126 and 128 to define a pair of mounting legs 136. Each mounting leg 136 defines a mounting hole 138 for operatively connecting the cushion pan bracket 26 to the height adjustment mechanism 100 as described below.

The height-adjustment mechanism 100 is generally conventional and allows simultaneous or independent adjustment of the height of the front and rear of the seat 10. The height-adjustment mechanism 100 includes front and rear torsion bars 102 and 104 which extend between and are rotatably secured to the upper tracks 30 within torsion bar openings 58. The two torsion bars can be identical and each includes a drive leg 106 and a pair of mountings legs 110 located toward opposite ends of the bar. The legs 106 and 110 are radially spaced approximately ninety degrees from each other. The drive leg 106 of the front torsion bar 102 is operatively connected to the front actuator 108, and the drive leg 106 of the rear torsion bar 104 is operatively connected to the rear actuator 112. As the front and rear actuators 108 and 112 operate, they push or pull on the drive legs 106 causing the torsion bar 102 and 104 to rotate. The mounting legs 110 of the front torsion bar 102 are pivotally secured to the mounting leg 136 at the front of each cushion pan bracket 26 and 28, and the mounting legs 110 of the rear torsion bar 102 are pivotally secured to the mounting leg 136 at the rear of each cushion pan bracket 26 and 28. When the torsion bars 102 and 104 rotate the mounting legs 110 rotate to either lift or lower the cushion pan brackets 26 and 28.

In use, the upper track flanges 40 interlock with the lower track channel 68 to reinforce the track assembly 12. During normal operation of the track assembly 12, the upper track flanges 40 travel within the lower track channel 68 without any contact between the components. However, during a collision, inertial loads may lift the upper track 30 causing the upper track flanges 40 to engage ears 70. The ears 70 retain the upper track 30 and reduce the chance of the upper track 30 separating from the lower track 32.

The inertial loads generated during a collision are transferred through the ears 70 to the reinforced portions 74 of the lower track bottom wall 64. As noted above, the floor supports 16 and 18 interlock directly with lower track bottom wall 64. Consequently, the loads are transferred directly from the lower track bottom wall 64 to the floor 14. This means that the lower track side walls 62 are not required to withstand the inertial loads.

Also, during a collision, the inertial forces exert a horizontal load on the track assembly 12. The drive mechanism 34, and more particularly, the rack 78 and drive screw 80 are required to withstand the horizontal loads. Large enough loads may result in elastic deformation of the gear housing 84, permitting the drive screw 80 to move horizontally with respect to the upper track 30. However, because of its disposition, the drive screw 80 will engage and transfer the loads to the upper track 30 after slight horizontal movement. In this manner, the upper track 30 reinforces the system by receiving the horizontal loads from the drive screw 80.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A track assembly for an automotive vehicle seat comprising:
   an upper track having a vertical web with a first longitudinally extended lower flange and a horizontal web defining a pair of opposed inwardly-opening longitudinally extended channels; and
   a lower track slidably interfitted with said upper track, said lower track including a pair of opposed outwardly-extending longitudinally extended upper flanges, said upper flanges slidably fitted within said channels of said upper track, said lower track further including a partially closed channel slidably fitted around said lower flange of said upper track.

2. A track assembly for an automotive vehicle seat comprising:
   an upper track having a vertical web with a first longitudinally extended lower flange and a horizontal web defining a pair of opposed longitudinally extended channels, said vertical web defining a slot and said horizontal web defining an opening, said slot and said opening cooperating to define a mount; and
   a lower track slidably interfitted with said upper track, said lower track including a pair of opposed longitudinally extended upper flanges, said upper flanges slidably fitted within said channels of said upper track, said lower track further including a partially closed channel slidably fitted around said lower flange of said upper track; and a drive means for moving said upper track with respect to said lower track, said drive means including a housing secured to said upper track within said mount and a drive screw rotatably mounted within said housing in approximate axial alignment with an intersection of said vertical web and said horizontal web.

3. The assembly of claim 2 further comprising a floor support for securing said lower track to a floor of an automotive vehicle, said support having a floor end adapted to mount to the floor and a track end adapted to engage said lower track, said track end defining a slot fitted over an end of said lower track immediately adjacent said partially closed channel.

4. The assembly of claim 3 wherein said upper track is generally +-shaped in cross section and said lower track is generally U-shaped in cross section.

5. The assembly of claim 4 wherein said upper track includes a second longitudinally extended upper flange, said first and second flanges extending outwardly in opposite directions from said vertical web.

6. The assembly of claim 5 wherein said partially closed channel is defined by a bottom wall of said lower track.

7. The assembly of claim 6 wherein said partially closed channel includes a pair of opposed, longitudinal ears extending inwardly toward each other from opposite top edges of said partially closed channel, said ears extending above said upper track flanges.

8. An automotive seat comprising:
  a track assembly adapted to mount to a floor of an automotive vehicle, said track assembly including an upper track and a lower track, said lower track having a bottom wall and a pair of opposed side walls, said upper track including a single vertical web having a bottom portion slidably interlocked with said bottom wall of said lower track, said upper track further including a horizontal web intersecting said vertical web and having opposite edges slidably interlocked with said opposed side walls of said lower track;
  a seat frame including a cushion pan; and
  a cushion pan bracket means for mounting said seat frame to said track assembly, said cushion pan bracket means mounted to said single vertical web of said upper track.

9. The seat of claim 8 wherein said lower track includes opposed longitudinal flanges protruding outwardly from said side walls, said upper track defining a pair of opposed channels slidably intermitted with said opposed flanges.

10. The seat of claim 9 wherein said upper track includes a first lower flange extending outwardly from said vertical web, said lower track defining a lower channel slidably interfitted with said first lower flange, said lower channel having a retaining wall extending above said first lower flange to prevent said upper track from being pulled vertically out of said lower channel.

11. An automotive seat comprising:
  a track assembly adapted to mount to a floor of an automotive vehicle, said track assembly including an upper track and a lower track, said lower track having a bottom wall and a pair of opposed side walls and including opposed longitudinal flanges protruding outwardly from said side walls, said lower track further defining a lower channel slidably interfitted with a first lower flange, said lower channel having a retaining wall extending above said first lower flange to prevent said upper track from being pulled vertically out of said lower channel, said upper track including a vertical web having a bottom portion slidably interlocked with said bottom wall of said lower track, said first lower flange extending outwardly from said vertical web, said upper track further including a horizontal web having opposite edges slidably interlocked with said opposed side walls of said lower track, said vertical web of said upper track defining a slot and said horizontal web of said upper track defining an opening, said slot and said opening cooperating to define a mount, said upper track further defining a pair of opposed channels slidably interfitted with said opposed flanges, said upper track includes;
  a seat frame including a cushion pan;
  a cushion pan bracket means for mounting said seat frame to said track assembly,
  said cushion pan bracket means mounted to said upper track; and a drive means for moving said upper track with respect to said lower track, said drive means including a housing secured to said upper track and a drive screw rotatably supported within said housing in approximate axial alignment with an intersection of said vertical web and said horizontal web.

12. The seat of claim 11 wherein said upper track is generally +-shaped in cross section and said lower track is generally U-shaped in cross section.

13. The seat of claim 12 wherein said upper track includes a second longitudinally extended upper flange, said first and second flanges extending outwardly in opposite directions from said vertical web.

14. The seat of claim 13 wherein said upper track and said lower track are aluminum extrusions.

15. A track pair for an automotive vehicle seat track assembly comprising:
  a lower track having a bottom wall;
  a +-shaped upper track including a single first vertical elongated web and a single second horizontal elongated web intersecting said first web;
  an interfit means for slidably interfitting said lower track and said first web of said upper track, said interfit means including an interfit flange slidably fitted within an interfit channel to permit said upper track to slide longitudinally with respect to said lower track; and
  an interlock means for slidably interlocking said second web of said upper track and said lower track, said interlock means including an interlock flange slidably fitted within an interlock channel, said interlock channel partially closed to resist vertical separation of said upper track from said lower track.

16. The track pair of claim 15 wherein said interfit means includes opposed longitudinal interfit flanges protruding outwardly from said first web and a pair of opposed interfit channels defined by said upper track.

17. The track pair of claim 16 wherein said interfit means includes opposed interlock flanges extending outwardly from said second web of said upper track.

18. A track pair for an automotive vehicle seat track assembly comprising:
  a lower track having a bottom wall;
  an upper track including intersecting first and second elongated webs, said first web of said upper track defining a slot and said second web of said upper track defining an opening, said slot and said opening cooperating to define a mount;
  an interfit means for slidably interfitting said lower track and said first web of said upper track, said interfit means including an interfit flange slidably fitted within an interfit channel to permit said upper track to slide longitudinally with respect to said lower track, further including opposed longitudinal interfit flanges protruding outwardly from said first web and a pair of opposed interfit channels defined by said upper track, and further including opposed interlock flanges extending outwardly from said second web of said upper track;

an interlock means for slidably interlocking said second web of said upper track and said lower track, said interlock means including an interlock flange slidably fitted within an interlock channel, said interlock channel partially closed to resist vertical separation of said upper track from said lower track; and a drive means for moving said upper track with respect to said lower track, said drive means including a housing secured to said upper track and a drive screw rotatably supported within said housing in approximate axial alignment with said intersection of said vertical web and said horizontal web.

19. The track pair of claim 18 wherein said upper track is generally +-shaped in cross section and said lower track is generally U-shaped in cross section.

20. The track pair of claim 19 wherein said first web extends in a generally horizontal direction and said second web extends in a generally vertical direction.

21. An automotive seat track comprising:

a first U-shaped track having two side walls interconnected by a bight wall, said bight wall defining an entrapment channel having a restricted mouth, said side walls each terminating in an edge opposite said bight wall; and a second +-shaped track slidably interfitted with said first track and including a single vertical stem web and a single horizontal cross web, said stem web including an edge opposite said cross web and entrapped within said entrapment channel in said bight wall of said first track, said cross web terminating at opposite edges across said stem web, said edges of said first track and said edges of said cross web of said second track defining interlock means for interlocking said first and second tracks.

22. An automotive seat track comprising:

a first track including a rack;

a second track including a drive gear engaging said rack, said second track slidably interfitted with said first track, rotation of said drive gear causing said second track to move relative said first track, said second track being +-shaped including a single vertical stem web and a single horizontal cross web meeting along a line of intersection, said stem web and said cross web being removed proximate said drive gear, said drive gear being axially aligned with said line of intersection.

* * * * *

UNITED STATES PATENT AND TRADEMARK OFFICE
CERTIFICATE OF CORRECTION

PATENT NO.  : 5,746,409
DATED       : May 5, 1998
INVENTOR(S) : Rees

It is certified that error appears in the above-indentified patent and that said Letters Patent is hereby corrected as shown below:

Column 6, Claim 2, Line 60:
    delete "and"

Column 7, Claim 9, Line 46:
    "intermitted" should be --interfitted--

Signed and Sealed this

Fifteenth Day of September, 1998

Attest:

BRUCE LEHMAN

Attesting Officer     Commissioner of Patents and Trademarks